(12) United States Patent
Fitzgerald

(10) Patent No.: US 7,810,202 B2
(45) Date of Patent: Oct. 12, 2010

(54) LEAF AND DEBRIS SWEEPER

(75) Inventor: Eddie Fitzgerald, Upwey (AU)

(73) Assignee: FPR Solutions Pty. Ltd., Càulfield, Victoria (AU)

( * ) Notice: Subject to any disclaimer, the term of this patent is extended or adjusted under 35 U.S.C. 154(b) by 1013 days.

(21) Appl. No.: 11/568,284

(22) PCT Filed: May 3, 2005

(86) PCT No.: PCT/AU2005/000634

§ 371 (c)(1),
(2), (4) Date: Oct. 25, 2006

(87) PCT Pub. No.: WO2005/106128

PCT Pub. Date: Nov. 10, 2005

(65) Prior Publication Data

US 2007/0169290 A1 Jul. 26, 2007

(30) Foreign Application Priority Data

May 3, 2004 (AU) ............................. 2004902331

(51) Int. Cl.
*E01H 1/04* (2006.01)
(52) U.S. Cl. ................................ 15/79.1; 15/80; 15/82; 15/83; 15/84
(58) Field of Classification Search .................. 15/79.1, 15/80, 82, 83, 84
See application file for complete search history.

(56) References Cited

U.S. PATENT DOCUMENTS

| | | | |
|---|---|---|---|
| 3,451,488 A | 6/1969 | Taketa | |
| 3,649,982 A * | 3/1972 | Mortensen | ..................... 15/84 |
| 4,217,672 A | 8/1980 | Olivari | |
| 4,549,326 A * | 10/1985 | Pineau | ........................ 15/84 |
| 4,939,406 A * | 7/1990 | Jeschonneck et al. | ....... 310/354 |
| 5,274,989 A | 1/1994 | Ng | |
| 5,743,076 A * | 4/1998 | Ng | .......................... 56/400.02 |
| 7,322,177 B2 * | 1/2008 | Geraghty | ..................... 56/344 |
| 2004/0045584 A1 * | 3/2004 | Mathews et al. | ............... 134/6 |

FOREIGN PATENT DOCUMENTS

| | | |
|---|---|---|
| BE | 884600 | 1/1980 |
| GB | 2224766 A | 5/1990 |

* cited by examiner

*Primary Examiner*—Shay L Karls
(74) *Attorney, Agent, or Firm*—Richard M. Goldberg

(57) ABSTRACT

A debris collecting device includes a rotatable drum 4 having a plurality of radially extending tynes 5 and a rake adapted to cooperate with the drum, the rake having dual arcuate shaped blades, including a debris releasing blade 7 and a reversing blade 9 adapted to contiguously contact either side of the drum over the whole length thereof at the respective leading edges thereof. The blades include elongate slots 11 adapted to intersect and accommodate the travel path of the tynes as the drum rotates such that debris pierced and picked up by the tynes rotating in a first direction is dislodged for transfer to a catcher 2.

9 Claims, 4 Drawing Sheets

LEAF AND DEBRIS SWEEPER

INTRODUCTION OF THE INVENTION

This invention relates to a device for selectively sweeping and collecting debris of a defined nature from lawns, gravel, paths and the like.

BACKGROUND OF THE INVENTION

Sweeping and clearing of paths, lawns and the like generally involves the gathering of leaves, paper and similar debris from an expanse of terrain, made up of lawn, grass, gravel or other surfaces of a compliant and movable nature. The terrain often includes areas of hard surface, paths, concrete, paving etc and the most frequently used tools include brooms, rakes and the like. In addition to such traditional sweeping tools, a range of powered blowers and vacuum systems are attracting increased use with a corresponding increase in noise and air pollution associated with such powered tools. In addition to all the above, some unique systems have been developed involving the careful and selective gathering of debris using innovative mechanics. This selective gathering of such debris from such surfaces can be accomplished by the use of spikes which pierce a wide range of debris where the spikes readily transverse or enter the surface of the terrain thereby picking up such piercable debris without disturbing the terrain.

Such mechanisms are known and incorporated in various debris collecting devices as disclosed in U.S. Pat. Nos. 3,451,488, 4,939,406, 5,274,989 and 5,743,076. Whilst such devices employ a fundamentally sound collecting mechanism they all suffer from drawbacks in the debris removal and collection mechanisms, particularly in the break up of debris during collection which makes complete gathering difficult. One object of the invention is to provide an improved debris collection device.

STATEMENT OF THE INVENTION

In a first aspect the invention provides a debris collecting device comprising a rotatable drum having a plurality of radially extending tynes and a rake adapted to cooperate with said drum wherein said rake has dual arcuate shaped blades including a debris releasing blade and a reversing blade adapted to contiguously contact either side of said drum over the whole length thereof at the respective leading edges thereof wherein said blades include elongate slots adapted to intersect and accommodate the travel path of said tynes as the drum rotates such that debris pierced and picked up by said tynes rotating in a first direction is dislodged for transfer to a catcher.

The blades of the rake may have a radius greater than the radius of said drum. The leading edges of the rake preferably contact the drum at an approximately normal position to the surface of the drum such that the apex of the rake fully accommodates said tynes thereby providing full traversal of the length of said tynes by the rake as the drum is rotated.

The debris is preferably dislodged into a reservoir positioned proximate to the rake. The debris is then preferably transferred from the reservoir via a conveyor to the catcher.

The debris releasing blade is most preferably formed as an extending lip of the debris reservoir. The conveyor most preferably includes a continuous flexible belt adapted to move in a first direction and which only operates in response to movement in the forward direction of the device. The belt is most preferably made up of a flexible mesh and is looped around two sets of pinions including a set of drive pinions at a first end and a set of slave pinions at a second end. The conveyor belt may include outwardly projecting steps with each step including a plurality of teeth. Alternatively, the steps may be solid and adopt an acute angle positioned relative to the conveyor.

The reservoir is most preferably shaped as a concave trough corresponding to the general travel path made by the conveyor and the conveyor steps extend outwardly from the conveyor belt. The device may include a conveyor comb positioned at the second end of the conveyor which is shaped and configured to cooperate with the movement and action of the conveyor steps wherein the comb allows teeth formed along the conveyor steps to pass through thereby dislodging any accumulated debris.

The device most preferably includes a catcher positioned at the rear thereof for receiving debris transported along the conveyor.

In an alternative embodiment the conveyor may be replaced with an auger for drawing the debris from the reservoir to the catcher.

BRIEF DESCRIPTION OF THE DRAWINGS

The invention will now be described with reference to FIGS. 1 to 4 and the accompanying Legend.

LEGEND

1 Main Housing
2 Catcher
3 Handle
4 Drum
5 Tynes
6 Front Skirt
7 Releasing Blade
8 Reservoir
9 Reversing Blade
10 Leading edge
11 Slot
12 Conveyor
13 Step
14 Teeth (optional)
15 Comb
16 Drum pivot
17 Pulley
18 Slave Pinion
19 Drum Housing
20 Cover
21 Chute
22 Lifting Wheels
23 Extending Lip
24 Drive Pinion

DETAILED DESCRIPTION OF THE INVENTION

Figure 1:
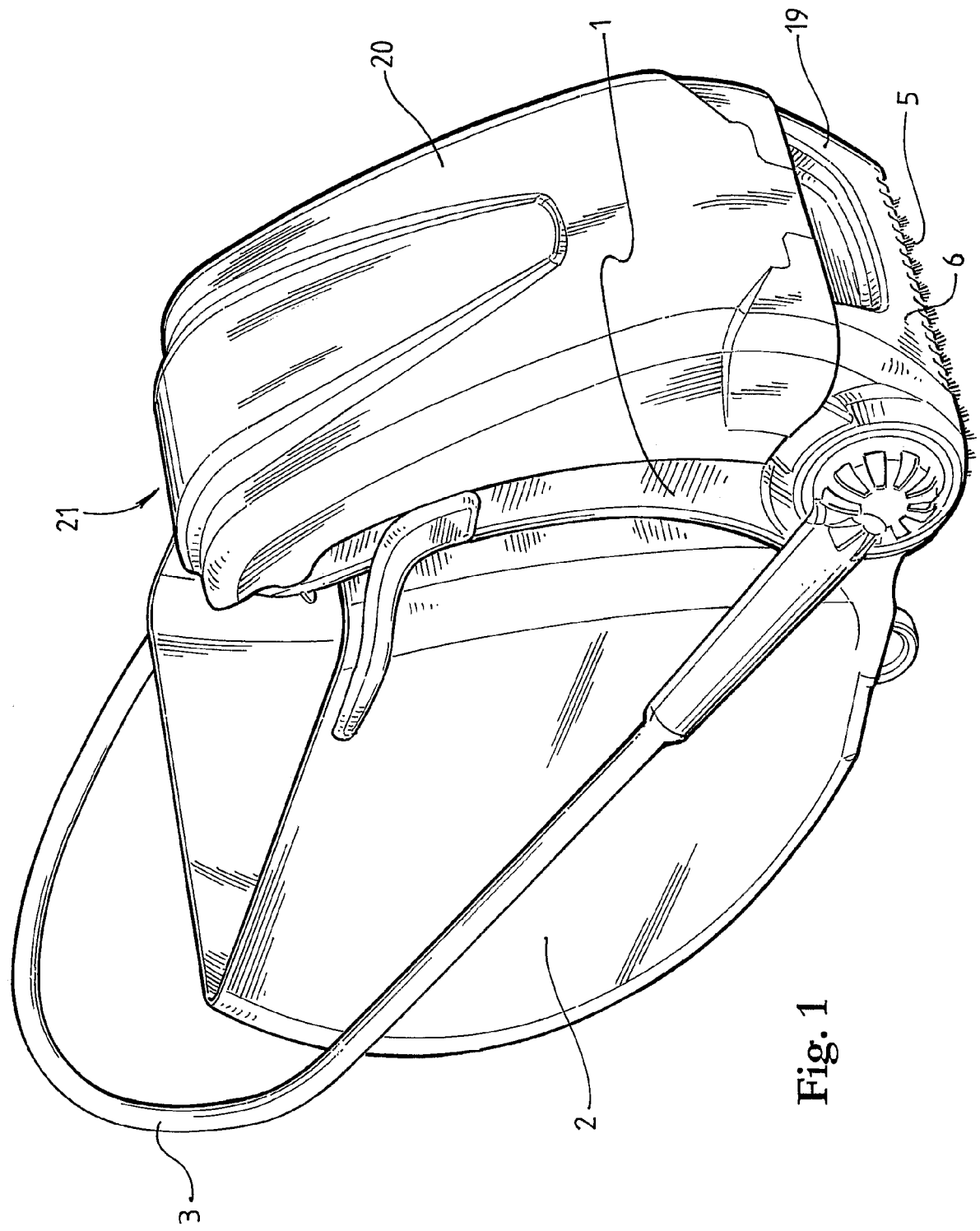
FIG. 1 shows an overall view of the device of the invention including a removable catcher.

Referring firstly to FIG. 1 there is shown an overall view of the debris collecting device of the invention, including a housing 1 and a catcher 2. The housing contains the mechanicals of the device and has a handle 3 for manual operation. This embodiment of the invention is adapted for hand-held manual use and is produced on the scale of similar proportions to hand operated lawn mowers.

The housing 1 is provided with an opening at its lower edge for projection of the tynes and the opening is particularly configured to provide a clearance port which allows for the specific control of the size of debris picked up by the device. The clearance port prevents large pieces of debris from being transported into the confines of the housing and thereby assist in preventing overly large pieces of debris from clogging up the mechanicals and action of the device. Overly large pieces of debris, for example, big pieces of bark or paper etc, will therefore be removed from the tynes as the debris encounters the clearance buffer and is withdrawn from the tynes before entry into the confines of the housing.

The mechanics of the invention comprise a rotatable drum 4 (hidden), pivoted within the housing in a horizontal orientation and adapted for rolling across the ground toward the front end of the device. The drum is provided with a plurality of evenly spaced radially extending tynes 5. The tynes operate as a continually rotating array of piercing spikes which are suitably dimensioned to extend beyond the front skirt 6 of the drum housing 19. In this manner, the device of the invention is adapted for manual operation by pushing along a piece of terrain thereby causing the drum to rotate as the projecting tynes roll over the terrain in a manner causing the tynes to penetrate or traverse the terrain being worked on. The tynes act to pierce, in a selective manner, any debris including leaves, paper and other piercable material from the surface of the terrain for collection. The operation of the device allows the user to push the device across the piece of terrain, for example a lawn or gravel path and in the process of moving the device across such piece of terrain, the drum is rotated as the tynes roll across the surface and in doing so, the tips of the tynes are caused to puncture or pierce debris of a piercable nature including leaves, paper etc. Once the debris has been penetrated, the tynes can easily negotiate the terrain without loosing the grasp of the pierced debris. As the device is pushed forward, the continual rotation of the drum causes the debris to be drawn up into the interior of the housing into a holding reservoir and conveyed to the catcher.

Figure 2:
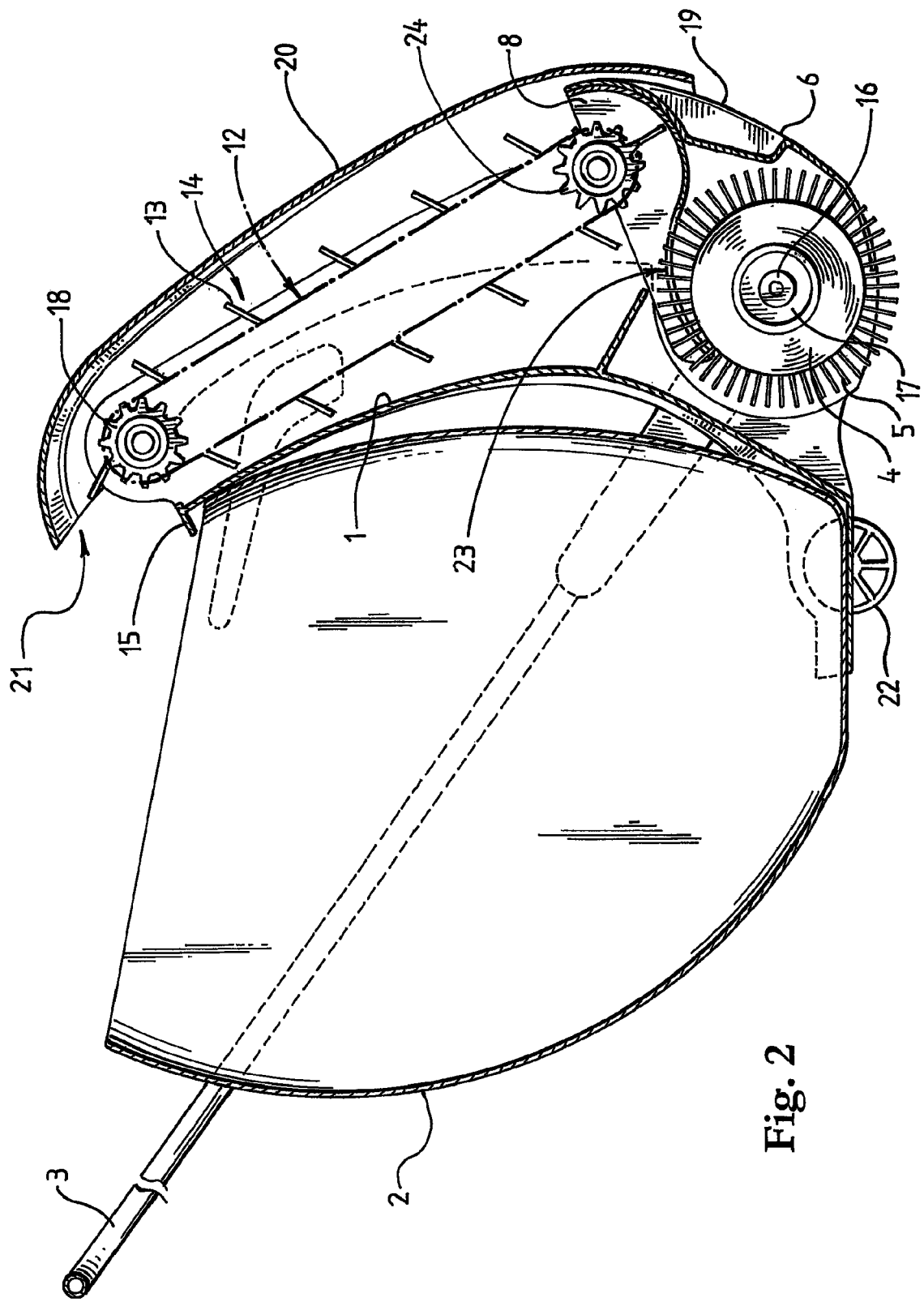
FIG. 2 shows a transparent side view of the device of the invention.
Figure 3:
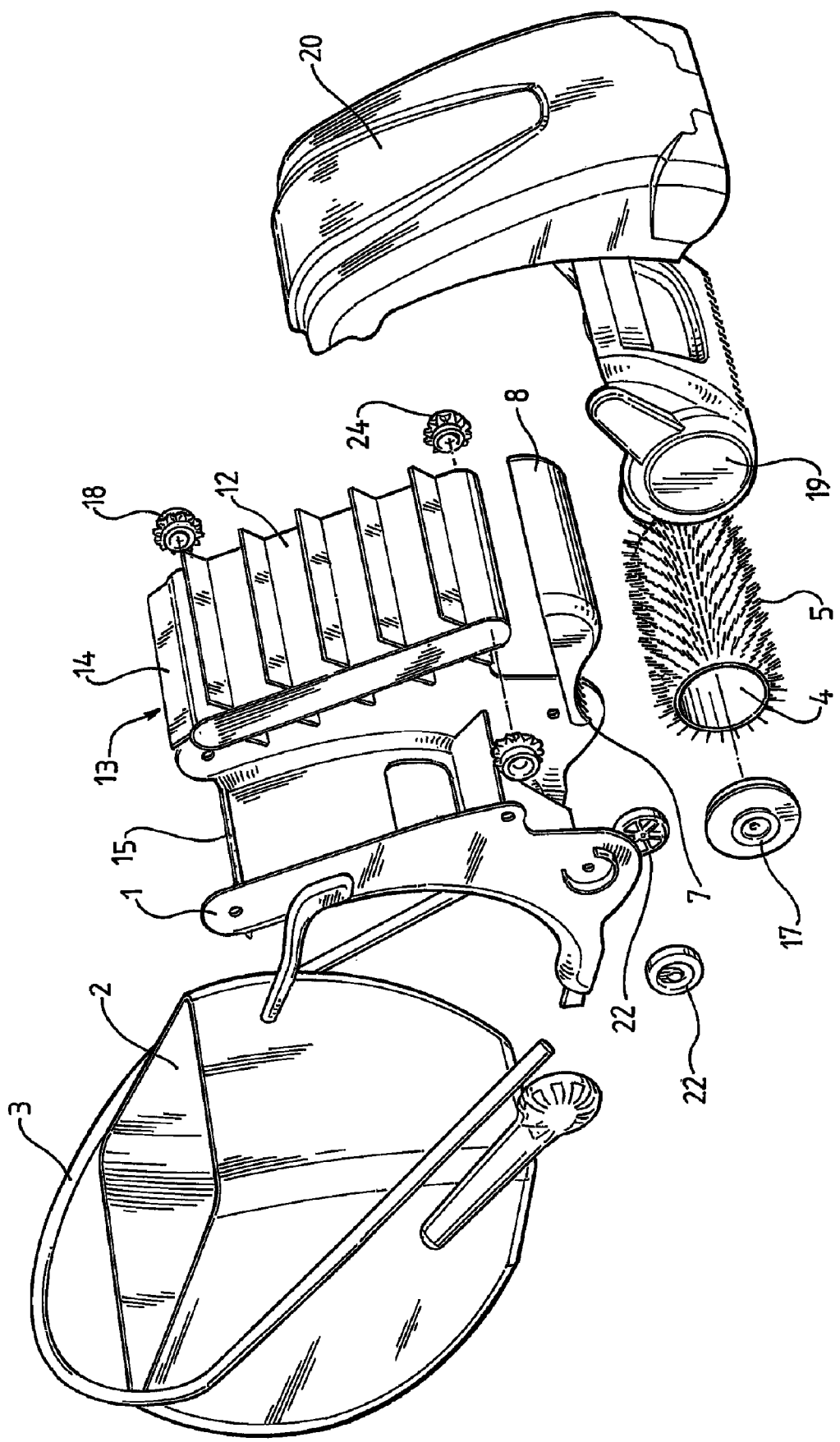
FIG. 3 shows an exploded front view of the invention.
Figure 4:
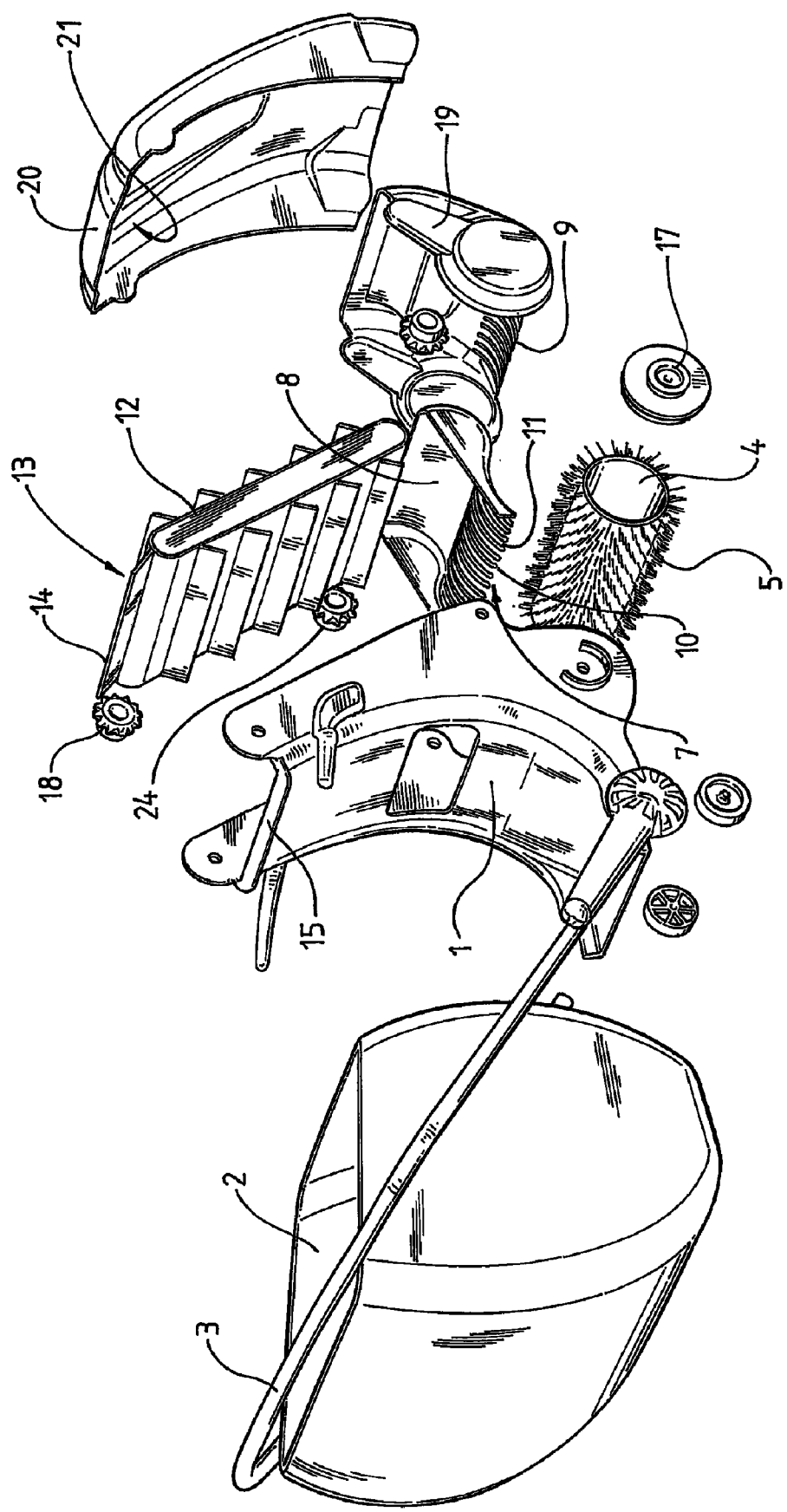
FIG. 4 shows an exploded rear view of the invention.

Referring now to the remaining FIGS. 2, 3 and 4, the details of the mechanicals of the device as shown with a cross-section side view in FIG. 2 and exploded views in FIGS. 3 and 4 from the front and rear. The debris collecting device has a main housing 1, onto which are fitted most of the component mechanical parts. The principal operating component of the device is the rotatable drum 4, having a series of outwardly projecting tynes 5. The drum is rotatably fitted to the lower region of the housing 1 via a suitable axle arrangement for free rotation responsive to the device being moved backward and forward across a piece of terrain. The drum and outwardly projecting tynes are designed to pierce and transport a selective range of debris and the forward movement of the device and rotation of the drum causes debris to be drawn up within the main housing 1 and into the reservoir 8. The reservoir 8 collects the debris after removal and lifting from the tynes 5 by way of the action of the extending lip of the reservoir forming a releasing blade 7 having a plurality of slots 11 dimensioned and configured to cooperate with the extending tynes 5 of the drum. The releasing blade 7 terminates at a leading edge 10 which is configured to contiguously contact the rotating drum over the substantive length thereof within the confines of the main housing 1. In this manner, the action of the rotating drum causes debris to be pierced and picked up at a rotating tynes transported to within the main housing 1 and disengaged from the rotating tynes by interaction with a releasing blade 7. The debris is then caused to collect in the reservoir 8 by virtue of the arcuate shaping of the releasing blade and the general trough shaped configuration of the reservoir 8. The arcuate shape of the releasing blade, and in particular the radius of the releasing blade being greater than the drum provides a vastly improved debris release from the tynes of the rotating drum over the prior art devices. The extended radius of the releasing blade allows the rotating tynes to gently ease the debris off, generally intact, rather than crumbling and breaking the debris up as occurs in the prior art devices. This action allows the debris to be manoeuvred and transported more efficiently to the catcher and greatly reduces any clogging or blocking of the transport mechanisms within the device as occurs with the prior art devices. The reservoir 8 serves as a temporary holding for collective debris which is then transported away from the reservoir into the catcher 2 by way of a conveyor 12 fitted within the main housing 1 so as to cooperate with the reservoir 8.

The particular configuration of the debris releasing blade includes a radius greater than the radius of the drum such that the leading edge 10 is able to contact a drum at an approximately normal position to the surface thereof and ensure the debris therein released falls in a generally passive manner within the confines of the reservoir 8.

The conveyor includes a continuous flexible belt formed of an appropriate material most preferably including a compliant mesh where the conveyor forms a continuous rotating upwardly inclined elevator for moving the debris collected in the reservoir 8 up the main housing for dispensing into the catcher 2. The conveyor includes a plurality of outwardly projecting steps 13 formed transversely across the length of the conveyor most preferably at an acute angle to the running surface of the conveyor. The steps may include a plurality of teeth 14. The inclined angle of the conveyor thereby allows the steps to function as collecting buckets so as to draw debris from the reservoir and continuously elevate the debris up the length of the housing at a suitably inclined angle for dispensing into the catcher 2. The conveyor is operated by way of drive pinions 24 formed at a first end of the conveyor. The drive pinions are activated by cooperation with a pulley 17, positioned at the end of the drum 4. A belt, chain or other drive mechanism causes the rotation of the drive pinion or pinions 24 which thereby cause the conveyor to move. The second end of the conveyor is provided with slave pinions 18 defining the travel path of the conveyor.

The configuration of the reservoir is shaped to reflect the travel path of the conveyor steps and teeth at the first end thereof, where the reservoir takes the form of a concave trough corresponding to the general travel path of the conveyor steps. In this manner, the movement of the conveyor around the drive pinions causes the conveyor steps to traverse the reservoir and draw up therefrom the debris collected therein for transmission up the conveyor to the second end thereof and for dispensing into the catcher 2. The inclined acute angle of the steps encourages the rapid release of debris as the conveyor traverses the slave pinions and effectively thrusts the debris into the catcher. Alternatively, the second end of the conveyor may be provided with a conveyor comb 15, which is adapted to cooperate with the conveyor steps and teeth (if used) so as to ensure the debris is drawn from the conveyor and substantially prevented from travelling down the conveyor and returning to the reservoir 8. The conveyor comb also ensures optimal and coordinated dispensing of the debris raised up within the main housing for controlled dispensing into the catcher 2. The main housing is provided with a cover 20 including a leaf chute 21 at the second end thereof, which assists in directing the movement of debris into the catcher 2.

The reservoir 8 is also adapted for cooperation with a drum housing 19 designed to include a front skirt 6 terminating in a reversing blade 9 of similar configuration to the releasing blade 7. The reversing blade 9 ensures that the movement of the device in the reverse direction will prevent debris collected on the tynes from being drawn up into the drum housing and thereby clogging the mechanism. The action of the drum pulley 17 may include a ratchet system such that the movement and rotation of the conveyor only occurs in one direction, regardless of the forward or reverse movement of the device and the corresponding forward and reverse movement of the driving drum 4. The drum pulley 17 may also incorporate either a one way ratchet or a reversing mechanism such that movement of the drum in a forward or reverse direction causes the pulley 17 to rotate only in a forward direction, therefore ensuring constant movement of the conveyor in the upward lifting direction irrespective of the movement of the device in a forward or reverse direction. This ensures constant emptying of the reservoir into the catcher 2 and prevents the inadvertent movement of debris into the confines of the device.

The catcher 2 is conveniently located onto the back of the main housing 1 and the ability of the conveyor to elevate the debris allows the catcher considerable capacity before requiring to be emptied. The device of the invention may also be provided with lifting wheels 22 which allows the device to be pivoted around the lifting wheels so as to raise the drum from the surface of the terrain so as to selectively activate the drum or avoid obstacles during use.

The invention provides for the first time, a compact highly efficient means of removing loose debris from gravel, grass or other types of terrain where the selective removal of piercable debris is required. The integrated design of the releasing blade and reservoir provides for a highly efficient means of conveying the debris as it is accumulated by elevation within the confines of the device cover for dispensing in a large capacity catcher. The provision of lifting wheels 22 underneath the catcher allows the device of the invention to accumulate a substantial weight in debris before requiring emptying and ensures adequate balance and ease of use.

The mode of operation of the invention has a high tendency to provide minimal interference with the debris by way of selective piercing and therefore does not break up the debris and cause smaller particulate matter to be distributed which would be difficult to gather. The mechanism provides that the debris remains substantially intact and can therefore be gently but persuasively compressed into the catcher in a manner that allows the catcher to retain a substantial amount of debris, thereby extending the user time of the device without having to empty the catcher. The ability of the mechanicals to provide forward and reverse operations, allows the device to be used in a similar manner to a carpet sweeper, such that repeated motion, backward and forth, across a piece of terrain allows the device to gather up substantially all suitable debris in a comprehensive and selective manner, without interfering with the terrain. The terrain can include grass, lawn, gravel, soil and all terrain that allows debris to be pierced by the tynes. The device of the invention would also operate on hard surface terrain, where debris can gather up in various layers and providing the tynes have the ability to pierce the debris, the device will work on virtually any terrain.

The invention provides for the first time, a highly efficient, user-friendly, manually operatable device for operation over a wide range of terrain, for the gathering up and collection of piercable debris. The manual operation of the invention, provides minimal environmental impact and can function to collect a wide range of debris including dry or wet leaves, paper etc. The device of the invention provides many advantages over commonly available debris handling devices including petrol operated blowers and vacuum cleaners. In addition to the devices ability to gather and collect debris, it also functions to aerate lawns and garden beds as a second action of the tynes piercing the debris. The selective action of the device does not interfere with lose terrain including gravel, dust, dirt, pebbles etc. The device can be used in all weather conditions and is not restricted to dry weather as it can readily be used after rain, given that wet or damp debris is readily picked up and without any electrical functions, the device is safe to use in all weather conditions.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The claims defining the invention are as follows:

1. A debris collecting device comprising:
    a rotatable drum having a plurality of radially extending debris piercing tynes,
    a rake adapted to cooperate with said drum, said rake comprising dual arcuate shaped blades, including a debris releasing blade and a reversing blade adapted to contiguously contact opposite sides of said drum over the whole length thereof at respective leading edges thereof, said blades including elongate slots adapted to intersect and accommodate a travel path of said tynes as the drum rotates such that debris pierced and picked up by said tynes rotating in a first direction is dislodged for transfer to a catcher,
    a reservoir positioned proximate to said rake and wherein said debris is dislodged into said reservoir, and said debris releasing blade is formed as an extending lip of said reservoir.

2. A debris collecting device according to claim 1, wherein the debris releasing blade has a radius greater than a radius of said drum with the leading edge thereof contacting said drum at an approximately normal position to an outer surface of the drum.

3. A debris collecting device according to claim 1, further comprising a conveyor which transfers said debris to said catcher.

4. A debris collecting device according to claim 3, wherein said conveyor includes a continuous flexible belt having a plurality of outwardly projecting steps such that an inclined angle of said conveyor allows said steps to function as buckets for drawing debris from said reservoir.

5. A debris collecting device according to claim 4, wherein said conveyor includes a set of drive pinions at a first end and a set of slave pinions at a second end, and said flexible belt is looped around said sets of drive pinions and slave pinions.

6. A debris collecting device according to claim 5, further comprising a reservoir positioned proximate to said rake and wherein said debris is dislodged into said reservoir, and wherein said reservoir is shaped as a concave trough corresponding to a general travel path of said conveyor steps at said first end during traversal of one said drive pinion.

7. A debris collecting device according to claim 5, further including a conveyor comb positioned at the second end of said conveyor and wherein said conveyor steps include a plurality of teeth adapted to traverse said comb so as to dislodge accumulated debris.

8. A debris collecting device according to claim 4, wherein said outwardly projecting steps are inclined at an acute angle to said conveyor.

9. A debris collecting device according to claim 1, further including said catcher which is positioned to receive said dislodged debris.

* * * * *